United States Patent
Nichani

(12) 
(10) Patent No.: US 6,259,827 B1
(45) Date of Patent: *Jul. 10, 2001

(54) MACHINE VISION METHODS FOR ENHANCING THE CONTRAST BETWEEN AN OBJECT AND ITS BACKGROUND USING MULTIPLE ON-AXIS IMAGES

(75) Inventor: Sanjay Nichani, Newton, MA (US)

(73) Assignee: Cognex Corporation, Natick, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/621,137

(22) Filed: Mar. 21, 1996

(51) Int. Cl.$^7$ .................................................. E05C 19/18
(52) U.S. Cl. ........................ 382/291; 382/145; 382/149; 382/173; 382/199; 250/559.05; 250/203.2; 358/464
(58) Field of Search ..................................... 382/173, 174, 382/176, 141, 142, 145, 147, 149, 143, 130, 199, 270, 294, 180; 348/87, 126, 127, 92; 358/464; 356/237; 250/223 B, 559.05

(56) References Cited

U.S. PATENT DOCUMENTS

| | | |
|---|---|---|
| 3,816,722 | 6/1974 | Sakoe et al. . |
| 3,936,800 | 2/1976 | Ejiri et al. . |
| 3,967,100 | 6/1976 | Shimomura . |
| 3,968,475 | 7/1976 | McMahon . |
| 3,978,326 | 8/1976 | Shimomura . |
| 4,011,403 | 3/1977 | Epstein et al. . |
| 4,115,702 | 9/1978 | Nopper . |
| 4,115,762 | 9/1978 | Akiyama et al. . |
| 4,183,013 | 1/1980 | Agrawala et al. . |
| 4,200,861 | 4/1980 | Hubach et al. . |
| 4,254,400 | 3/1981 | Yoda et al. . |
| 4,286,293 * | 8/1981 | Jablonowski ........................ 358/101 |
| 4,300,164 | 11/1981 | Sacks . |
| 4,385,322 | 5/1983 | Hubach et al. . |
| 4,441,124 * | 4/1984 | Heebner et al. ..................... 358/106 |
| 4,441,206 | 4/1984 | Kuniyoshi et al. . |
| 4,519,041 * | 5/1985 | Fant et al. ........................... 364/468 |
| 4,534,813 | 8/1985 | Williamson et al. . |
| 4,541,116 | 9/1985 | Lougheed . |
| 4,570,180 | 2/1986 | Baier et al. . |
| 4,577,344 | 3/1986 | Warren et al. . |
| 4,581,762 | 4/1986 | Lapidus et al. . |
| 4,606,065 | 8/1986 | Beg et al. . |
| 4,617,619 | 10/1986 | Gehly . |
| 4,630,306 | 12/1986 | West et al. . |
| 4,688,088 | 8/1987 | Hamazaki et al. . |
| 4,706,168 | 11/1987 | Weisner . |
| 4,728,195 | 3/1988 | Silver . |
| 4,730,260 | 3/1988 | Mori et al. . |
| 4,731,858 | 3/1988 | Grasmueller et al. . |
| 4,736,437 | 4/1988 | Sacks et al. . |
| 4,742,551 | 5/1988 | Deering . |
| 4,755,874 * | 7/1988 | Esrig et al. ......................... 358/106 |

(List continued on next page.)

OTHER PUBLICATIONS

Grimson, W. Eric L. and Huttenlocher, Daniel, P., "On the Sensitivity of the Hough Transform for Object Recognition", May 1990, IEEE Transactions on Pattern Analysis and Machine Intelligence, vol. 12, No. 3.

(List continued on next page.)

Primary Examiner—Matthew C. Bella
Assistant Examiner—Sheela Chawan
(74) Attorney, Agent, or Firm—David J. Powsner

(57) ABSTRACT

Machine vision methods for segmenting an image include the steps of generating a first image of the background of an object, generating a second image of the object and background, and subtracting the second image from the first image. The methods are characterized in that the second image is generated such that subtraction of it from the first image emphasizes the object with respect to the background.

60 Claims, 7 Drawing Sheets

U.S. PATENT DOCUMENTS

| | | | |
|---|---|---|---|
| 4,758,782 | * 7/1988 | Kobayashi | 324/73 |
| 4,764,870 | 8/1988 | Haskin . | |
| 4,771,469 | 9/1988 | Wittenburg . | |
| 4,782,238 | * 11/1988 | Radl et al. | 250/561 |
| 4,783,826 | 11/1988 | Koso . | |
| 4,783,828 | 11/1988 | Sadjadi . | |
| 4,783,829 | 11/1988 | Miyakawa et al. . | |
| 4,831,580 | 5/1989 | Yamada . | |
| 4,860,374 | 8/1989 | Murakami et al. . | |
| 4,860,375 | 8/1989 | McCubbrey et al. . | |
| 4,876,457 | 10/1989 | Bose . | |
| 4,876,728 | 10/1989 | Roth . | |
| 4,903,218 | 2/1990 | Longo et al. . | |
| 4,907,169 | 3/1990 | Lovoi . | |
| 4,914,553 | 4/1990 | Hamada et al. . | |
| 4,922,543 | 5/1990 | Ahlbom et al. . | |
| 4,926,492 | 5/1990 | Tanaka et al. . | |
| 4,932,065 | 6/1990 | Feldgajer . | |
| 4,953,224 | 8/1990 | Ichinose et al. . | |
| 4,955,062 | 9/1990 | Terui . | |
| 4,959,898 | 10/1990 | Landman et al. . | |
| 4,962,423 | 10/1990 | Yamada et al. . | |
| 4,972,359 | 11/1990 | Silver et al. . | |
| 4,982,438 | 1/1991 | Usami et al. . | |
| 5,012,402 | 4/1991 | Akiyama . | |
| 5,012,524 | * 4/1991 | Le Beau | 382/8 |
| 5,046,190 | 9/1991 | Daniel et al. . | |
| 5,054,096 | 10/1991 | Beizer . | |
| 5,060,276 | 10/1991 | Morris et al. . | |
| 5,063,608 | 11/1991 | Siegel . | |
| 5,073,958 | 12/1991 | Imme . | |
| 5,081,656 | 1/1992 | Baker et al. . | |
| 5,081,689 | 1/1992 | Meyer et al. . | |
| 5,086,478 | 2/1992 | Kelly-Mahaffey et al. . | |
| 5,090,576 | 2/1992 | Menten . | |
| 5,091,861 | 2/1992 | Geller et al. . | |
| 5,091,968 | 2/1992 | Higgins et al. . | |
| 5,093,867 | 3/1992 | Hori et al. . | |
| 5,113,565 | 5/1992 | Cipolla et al. . | |
| 5,115,309 | 5/1992 | Hang . | |
| 5,119,435 | 6/1992 | Berkin . | |
| 5,124,622 | 6/1992 | Kawamura et al. . | |
| 5,133,022 | 7/1992 | Weideman . | |
| 5,134,575 | 7/1992 | Takagi . | |
| 5,143,436 | 9/1992 | Baylor et al. . | |
| 5,145,432 | 9/1992 | Midland et al. . | |
| 5,151,951 | 9/1992 | Ueda et al. . | |
| 5,153,925 | 10/1992 | Tanioka et al. . | |
| 5,159,281 | 10/1992 | Hedstrom et al. . | |
| 5,159,645 | 10/1992 | Kumagai . | |
| 5,164,994 | 11/1992 | Bushroe . | |
| 5,168,269 | 12/1992 | Harlan . | |
| 5,185,855 | 2/1993 | Kato et al. . | |
| 5,189,712 | 2/1993 | Kajiwara et al. . | |
| 5,206,820 | 4/1993 | Ammann et al. . | |
| 5,216,503 | 6/1993 | Paik . | |
| 5,225,940 | 7/1993 | Ishii et al. . | |
| 5,230,027 | 7/1993 | Kikuchi . | |
| 5,243,607 | 9/1993 | Masson et al. . | |
| 5,253,306 | 10/1993 | Nishio . | |
| 5,253,308 | 10/1993 | Johnson . | |
| 5,265,173 | 11/1993 | Griffin et al. . | |
| 5,271,068 | 12/1993 | Ueda et al. . | |
| 5,287,449 | 2/1994 | Kojima . | |
| 5,297,256 | 3/1994 | Wolstenholme et al. . | |
| 5,299,269 | 3/1994 | Gaborski et al. . | |
| 5,311,598 | * 5/1994 | Bose et al. | 382/8 |
| 5,315,388 | 5/1994 | Shen et al. . | |
| 5,319,457 | 6/1994 | Nakahashi et al. . | |
| 5,327,156 | 7/1994 | Masukane et al. . | |
| 5,337,267 | 8/1994 | Colavin . | |
| 5,363,507 | 11/1994 | Nakayama et al. . | |
| 5,367,439 | 11/1994 | Mayer et al. . | |
| 5,367,667 | 11/1994 | Wahlquist et al. . | |
| 5,371,690 | 12/1994 | Engel et al. . | |
| 5,388,197 | 2/1995 | Rayner . | |
| 5,388,252 | 2/1995 | Dreste et al. . | |
| 5,398,292 | 3/1995 | Aoyama . | |
| 5,432,525 | 7/1995 | Maruo et al. . | |
| 5,440,699 | 8/1995 | Farrand et al. . | |
| 5,455,870 | 10/1995 | Sepai et al. . | |
| 5,455,933 | 10/1995 | Schieve et al. . | |
| 5,475,766 | 12/1995 | Tsuchiya et al. . | |
| 5,477,138 | 12/1995 | Efjavic et al. . | |
| 5,481,712 | 1/1996 | Silver et al. . | |
| 5,485,570 | 1/1996 | Bushboom et al. . | |
| 5,491,780 | 2/1996 | Fyles et al. . | |
| 5,495,424 | 2/1996 | Tokura . | |
| 5,495,537 | 2/1996 | Bedrosian et al. . | |
| 5,519,840 | 5/1996 | Matias et al. . | |
| 5,526,050 | 6/1996 | King et al. . | |
| 5,532,739 | 7/1996 | Garakani et al. . | |
| 5,550,763 | 8/1996 | Michael . | |
| 5,566,877 | 10/1996 | McCormack . | |
| 5,568,563 | * 10/1996 | Tanaka et al. | 382/144 |
| 5,574,668 | 11/1996 | Beaty . | |
| 5,574,801 | 11/1996 | Collet-Beillon . | |
| 5,583,949 | 12/1996 | Smith et al. . | |
| 5,583,954 | 12/1996 | Garakani . | |
| 5,592,562 | 1/1997 | Rooks . | |
| 5,594,859 | 1/1997 | Palmer et al. . | |
| 5,602,937 | 2/1997 | Bedrosian et al. . | |
| 5,608,872 | 3/1997 | Schwartz et al. . | |
| 5,640,199 | * 6/1997 | Garakani et al. | 348/87 |
| 5,640,200 | * 6/1997 | Michael | 348/86 |
| 5,724,439 | * 3/1998 | Mizuoka et al. | 382/145 |
| 5,748,775 | * 5/1998 | Tsuchikawa et al. | 382/190 |
| 5,828,776 | * 10/1998 | Lee et al. | 382/133 |

OTHER PUBLICATIONS

Medina–Mora et al. (1981) An Incremental Programming Environment, IEEE Transactions on Software Eng. SE–7:472–482.

Teitelbaum et al. (19810 The Cornell Program Synthesizer: A Syntax–Directed Programming Environment, Communications of the ACM 24:563–573.

Newsletter from Acquity Imaging, Inc., "Remote Vision Support Package—The Phones Are Ringing!," 1 page.

PictureTel Corporation Product Brochure "PictureTel Live PCS 100(tm) Personal Visual Communications System," 3 pp. (1993).

PictureTel Corporation Product Brochure "PictureTel System 1000: Complete Videoconferencing for Cost Sensitive Applications," 4 pp. (1993).

PictureTel Corporation Product Brochure, "PictureTel System 4000(tm) A Family of Models to Fit Your Application from Offices to Boardrooms, Classrooms, and Auditoriums," 4 pp. (1993).

Symantec Corporation, "The Norton pcAnywhere User's Guide," Table of Contents 8 pp; Introduction of pcAnywhere Technology pp i–vii; Chapter 7—Sessions; pp. 191–240 (1991).

Bursky, Dave, "CMOS Four–Chip Set Process Images at 20–MHz Data Rates," Electronic Design, May 28, 1987, pp. 39–44.

Plessey Semiconductors, Preliminary Information, May 1986, Publication No. PS2067, May 1986, pp. 1–5.

NEC Electronics Inc., PD7281 Image Pipelined Processor, Product Information Brochure, pp. 2–169–2–211.

Horn, Berthold Klaus Paul. "Robot Vision", The Massachusetts Institute for Technology, 1986.

Rosenfeld, Azriel. "Computer Vision: Basic Principles," Proceedings of the IEEE. vol. 76, No. 8, Aug. 1988. pp. 863–868.

Rosenfeld, Azriel. "Computer Vision: Basic Principles" *Proceedings of the IEEE*. vol. 76, No. 8, Aug., 1988. pp. 863–868.

* cited by examiner (Object-to-Background Contrast: Positive)

(Object-to-Background Contrast: Negative)

(Object-to-Background Contrast: Enhanced)

(Background Only)

(Object + Background)

(Object-to-Background
Contrast: High)

MACHINE VISION METHODS FOR ENHANCING THE CONTRAST BETWEEN AN OBJECT AND ITS BACKGROUND USING MULTIPLE ON-AXIS IMAGES

REFERENCE TO RELATED APPLICATIONS

This application is related to copending, commonly assigned U.S. patent application Ser. No. 08/621,189, for MACHINE VISION METHODS FOR INSPECTION OF LEADS ON SEMICONDUCTOR DIE PACKAGES, filed this same day herewith, the teachings of which are incorporated herein by reference.

This application is related to copending, commonly assigned U.S. patent application Ser. No. 08/621,190, for MACHINE VISION METHODS FOR INSPECTION OF SEMICONDUCTOR DIE SURFACES, filed this same day herewith, the teachings of which are incorporated herein by reference.

RESERVATION OF COPYRIGHT

The disclosure of this patent document contains material which is subject to copyright protection. The owner thereof has no objection to facsimile reproduction by anyone of the patent document or of the patent disclosure, as it appears in the U.S. Patent and Trademark Office patent file or records, but otherwise reserves all rights under copyright law.

BACKGROUND OF THE INVENTION

The invention pertains to machine vision and, more particularly, to methods for image segmentation and object identification and defect detection.

In automated manufacturing, it is often important to determine the location, shape, size and/or angular orientation of an object being processed or assembled. For example, in automated wire bonding of integrated circuits, the precise location of leads in the "lead frame" and pads on the semiconductor die must be determined before wire bonds can be soldered them.

Although the human eye can readily distinguish between objects in an image, this is not historically the case for computerized machine vision systems. In the field of machine vision, the task of analyzing an image to isolate and identify its features is referred to as image segmentation. In an image of a lead frame, image segmentation can be employed to identify pixels in the image representing the leads, as well as those representing all other features, i.e., "background." By assigning values of "1" to the pixels representing leads, and by assigning values of "0" to the background pixels, image segmentation facilitates analysis of the image by other machine vision tools, such as "connectivity" analysis.

The prior art suggests a number of techniques for segmenting an image. Thresholding, for example, involves identifying image intensities that distinguish an object (i.e., any feature of interest) from its background (i.e., any feature not of interest). For example, in an image of a lead frame, thresholding can be used to find an appropriate shade of gray that distinguishes each pixel in the image as object (i.e., lead) or background, thereby, completing segmentation. More complex thresholding techniques generate multiple threshold values that additionally permit the object to be identified.

Connectivity analysis is employed to isolate the features in a thresholded image. This technique segregates individual features by identifying their component pixels, particularly, those that are connected to each other by virtue of horizontal, vertical or diagonal adjacency.

Though the segmentation techniques described above are useful in isolating features of simple objects, they are often of only limited value in identifying objects with complex backgrounds. This typically arises in defect detection, that is, in segmenting images to identify defects on visually complicated surfaces, such as the surface of a semiconductor die, a printed circuit board, and printed materials. In these instances, segmentation is used to isolate a defect (if any) on these complex surfaces. If the surface has no defects, segmentation should reveal no object and only background. Otherwise, it should reveal the defect in the image as clusters of 1's against a background 0's.

To aid in segmenting complicated images, the prior art developed golden template comparison (GTC). This is a technique for locating defects by comparing a feature under scrutiny (to wit, a semiconductor die surface) to a good image—or golden template—that is stored in memory. The technique subtracts the good image from the test image and analyzes the difference to determine if the expected object (e.g., a defect) is present. For example, upon subtracting the image of a good pharmaceutical label from a defective one, the resulting "difference" image would reveal missing words and portions of characters.

Before GTC inspections can be performed, it must be "trained" so that the golden template can be stored in memory. To this end, the GTC training functions are employed to analyze several good samples of a scene to create a "mean" image and "standard deviation" image. The mean image is a statistical average of all the samples analyzed by the training functions. It defines what a typical good scene looks like. The standard deviation image defines those areas on the object where there is little variation from part to part, as well as those areas in which there is great variation from part to part. This latter image permits GTC's runtime inspection functions to use less sensitivity in areas of greater expected variation, and more sensitivity in areas of less expected variation. In all cases, the edges present in the parts give rise a large standard deviation as a result of discrete pixel registration requirements, thus decreasing sensitivity in those regions.

At runtime, a system employing GTC captures an image of a scene of interest. Where the position of that scene is different from the training position, the captured image is aligned, or registered, with the mean image. The intensities of the captured image are also normalized with those of the mean image to ensure that variations illumination do not adversely affect the comparison.

The GTC inspection functions then subtract the registered, normalized, captured image from the mean image to produce a difference image that contains all the variations between the two. That difference image is then compared with a "threshold" image derived from the standard deviation image. This determines which pixels of the difference image are to be ignored and which should be analyzed as possible defects. The latter are subjected to morphology, to eliminate or accentuate pixel data patterns and to eliminate noise. An object recognition technique, such as connectivity analysis, can then be employed to classify the apparent defects.

Although GTC inspection tools have proven quite successful, they suffer some limitations. For example, except in unusual circumstances, GTC requires registration—i.e., that the image under inspection be registered with the template image. GTC also uses a standard deviation image for thresholding, which can result in a loss of resolution near edges due to high resulting threshold values. GTC is, additionally, limited to applications where the images are repeatable: it cannot be used where image-to-image variation results form changes in size, shape, orientation and warping.

An object of this invention, therefore, is to provide improved methods for machine vision and, more particularly, improved methods for image segmentation.

A further object is to provide such methods that can be used for defect identification.

Yet another object is to provide such methods that can be used in segmenting and inspecting repeatable, as well as non-repeatable, images.

Yet still another object is to provide such methods that do not routinely necessitate alignment or registration of an image under inspection with a template image.

Still yet a further object of the invention is to provide such methods that do not require training.

Still other objects of the invention include providing such machine vision methods as can be readily implemented on existing machine vision processing equipment, and which can be implemented for rapid execution without excessive consumption of computational power.

SUMMARY OF THE INVENTION

The foregoing objects are among those achieved by the invention which provides, in one aspect, a machine vision method for segmenting an image. The method includes the steps of generating a first image of at least the "background" or an object, generating a second image of the object and background, and subtracting the second image from the first image. The method is characterized in that the second image is generated such that subtraction of it from the first image emphasizes the object with respect to the background. As used here and throughout, unless otherwise evident from context, the term "object" refers to features of interest in an image (e.g., a defect), while the term "background" refers to features in an image that are not of interest (e.g., surface features on the semiconductor die on which the defect appears).

In related aspects of the invention, the second step is characterized as generating the second image such that its subtraction from the first image increases a contrast between the object and the background. That step is characterized, in still further aspects of the invention, as being one that results in object-to-background contrast differences in the second image that are of opposite polarity from the object-to-background contrast differences in the first image.

In further aspects, the invention calls for generating a third image with the results of the subtraction, and for isolating the object on that third image. Isolation can be performed, according to other aspects of the invention, by connectivity analysis, edge detection and/or tracking, and by thresholding. In the latter regard, a threshold image—as opposed to one or two threshold values—can be generated by mapping image intensity values of the first or second image. That threshold image can, then, be subtracted from the third image (i.e, the difference image) to isolate further the object.

Still further objects of the invention provide for normalizing the first and second images before subtracting them to generate the third image. In this aspect, the invention determines distributions of intensity values of each of the first and second images, applying mapping functions to one or both of them in order to match the tails of those distributions. The first and second images can also be registered prior to subtraction.

According to further aspects of the invention, the first and second images are generated by illuminating the object and/or its background with different respective light or emission sources. This includes, for example, illuminating the object from the front in order to generate the first image, and illuminating it from behind in order to generate the second image. This includes, by way of further example, illuminating the object and its background with direct, on-axis lighting to generate the first image, and illuminating it with diffuse, off-access or grazing light to generate the second image. This includes, by way of still further example, illuminating the object with different wavelengths of light (e.g., red and blue) for each of the respective images, or in capturing reflections of different orientations (e.g., polarized and unpolarized) reflected from the object.

Additional aspects of the invention provide methods incorporating various combinations of the foregoing aspects.

These and other aspects of the invention are evident in the drawings and in the descriptions that follow.

BRIEF DESCRIPTION OF THE DRAWINGS

A better understanding of the invention may be attained by reference to the drawings in which.

DETAILED DESCRIPTION OF THE ILLUSTRATED EMBODIMENT

Figure 1:
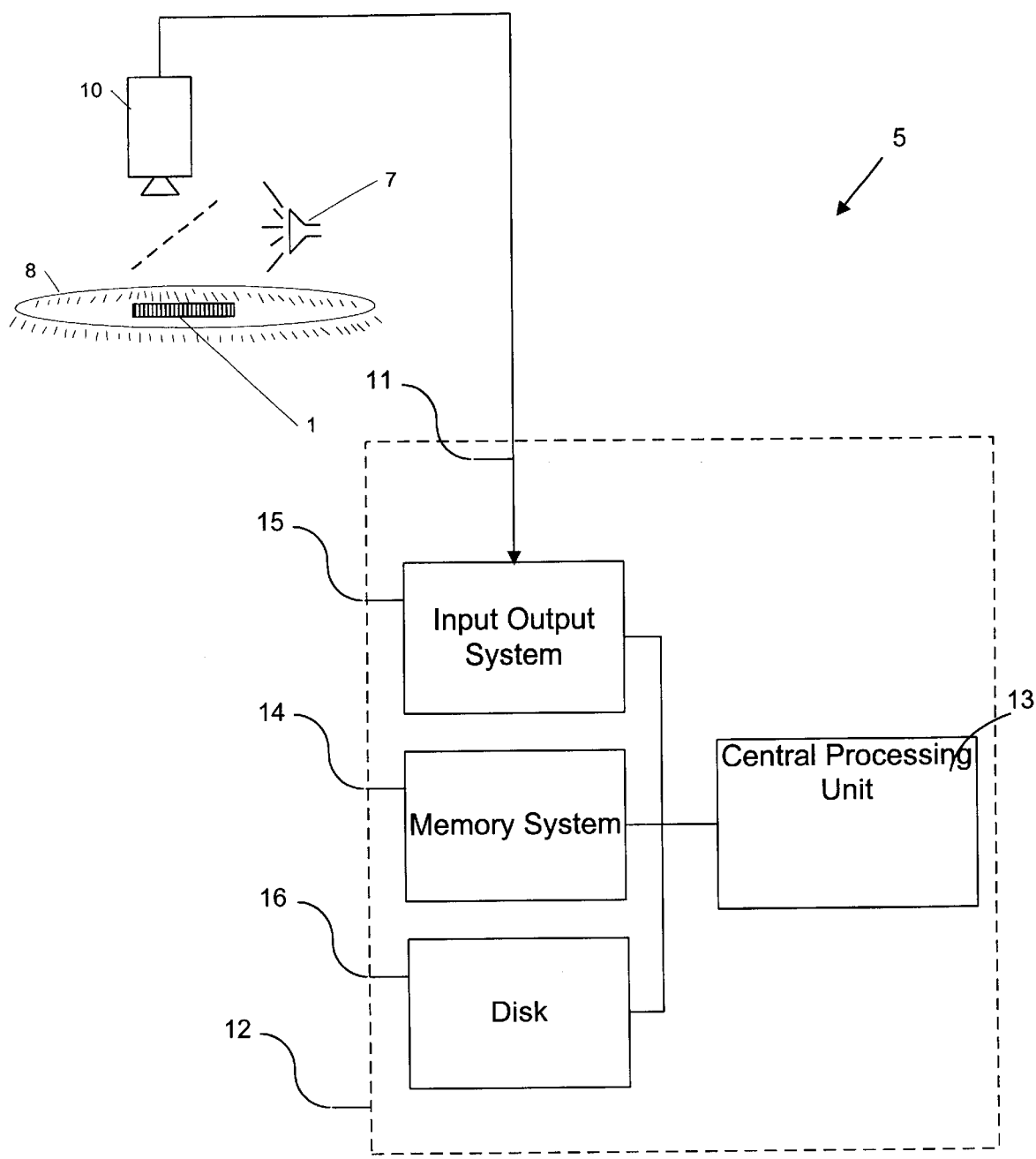
FIG. 1 depicts a machine vision system for practice of the invention.

FIG. 1 illustrates a system 5 for determining machine vision image segmentation according to the invention. The system 5 includes a capturing device 10, such as a conventional video camera (such as the Sony XC75 camera with COSMICAR lens) or scanner, that generates an image of a scene including an object 1. Image data (or pixels) generated by the capturing device 10 represent, in the conventional manner, the image intensity (e.g., color or brightness) of each point in the scene at the resolution of the capturing device. The illustrated object is illuminated by on-axis light 7 and ring light 8 for generation of multiple images for segmentation in accord with methods discussed herein.

The digital image data is transmitted from capturing device 10 via a communications path 11 to an image analysis system 12. This can be a conventional digital data processor, or a vision processing system (such as the Cognex 5400) of the type commercially available from the assignee hereof, Cognex Corporation, programmed in accord with the teachings hereof to perform image segmentation. The image analysis system 12 may have one or more central processing units 13, main memory 14, input-output system 15, and disc drive (or other mass storage device) 16, all of the conventional type.

The system 12 and, more particularly, central processing unit 13, is configured by programming instructions according to the teachings hereof for image segmentation, as described in further detail below. Those skilled in the art will appreciate that, in addition to implementation on a programmable digital data processor, the methods and apparatus taught herein can be implemented in special purpose hardware.

Figure 2A:
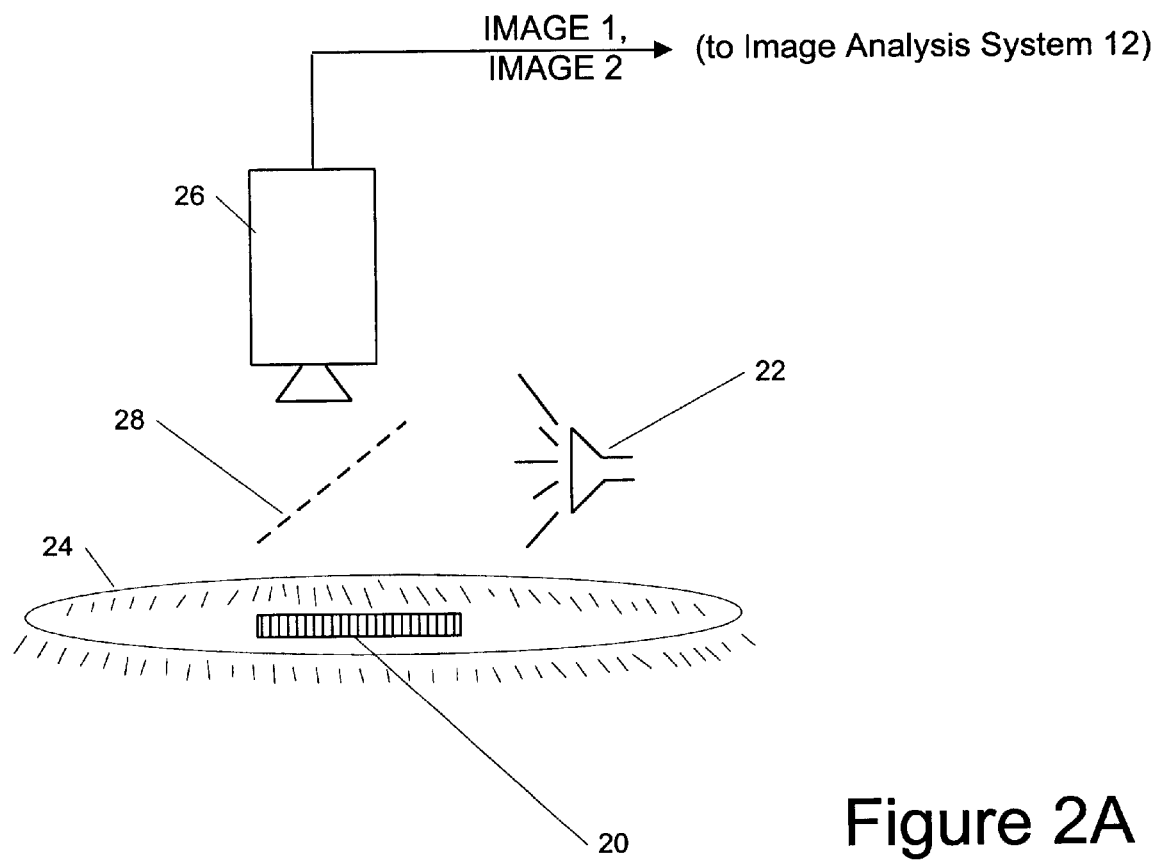
FIGS. 2A–2C depict illumination arrangements for generating images analyzed in accord with the invention.

FIG. 2A illustrates an arrangement of emission sources according to the invention for on-axis and diffuse (or grazing) light illumination of a circuit element 20, e.g., a semiconductor die. The arrangement includes lighting sources 22 and 24 for illuminating the surface of element 20. Lighting source 22 provides direct, on-axis lighting, via reflection off a half-silvered, partially transparent, angled, one-way mirror 28. Lighting source 24 provides diffuse, off-access lighting, or grazing light, for illuminating the object. Images of the illuminated element 20 are captured by camera 26

Lighting source 22 is of the conventional type known in the art for on-axis illumination of objects under inspection in a machine vision application. A preferred such light is a diffused on-axis light (DOAL) commercially available from Dolan Jenner. The source 22 is positioned to cause objects (i.e., potential defects) on the surface of element 20 to appear as dark features against a light background.

Lighting source 24 is also of a conventional type known in the art for use in providing diffuse, off-axis light or grazing light in machine vision applications. One preferred source 24 is an arrangement of several point light sources, e.g., fiber optic bundles, or line lights, disposed about element 20. Another preferred such lighting source 24 is a ring light and, still more preferably, a ring light of the type disclosed in commonly assigned U.S. Pat. No. 5,367,439. The lighting source 24 is positioned to illuminate the surface of element 20 in such a way to cause objects (i.e., potential defects) thereon to appear as light features against a dark background.

Other lighting sources known in the art can be used in place of on-axis source 22 and ring light source 24 to illuminate a surface under inspection. Considerations for selection and positioning of the sources 22, 24 are that objects thereon, e.g., expected defects, appear differently (if at all) with respect to the background when illuminated by each respective source 22, 24.

More particularly, the lighting sources 22, 24 are selected and positioned in such that the subtraction of an image captured by camera 26 when the surface is illuminated by one of the sources (e.g., 22) from an image captured by camera 26 when the surface is illuminated by the other source (e.g., 24) emphasizes objects on that surface—e.g., by increasing the contrast between the object and the background (i.e., the remainder of the surface).

Put another way, the lighting sources 22, 24 are selected and positioned in such a way that an image generated by camera 26 when the surface is illuminated one source has an object-to-background contrast of an opposite polarity then the object-to-background contrast of an image generated by camera 26 when the surface is illuminated the other source.

Thus, for example, in a preferred arrangement to detect defects on the surface of a semiconductor die or leads of its package (or lead frame)—and, particularly, unwanted adhesive patches on those dies or leads—the on-axis lighting source 22 is selected and positioned (in conjunction with mirror 28) to cause the defect to be dark on a light background (e.g., "positive" object-to-background contrast polarity), while the diffuse ring light 24 is selected and positioned to make the same defect appear light on a dark background (e.g., "negative" object-to-background contrast polarity).

Figure 3A:
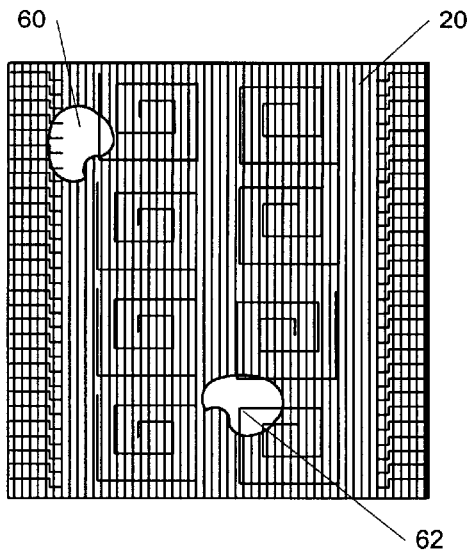
FIGS. 3A–3F depict sample images (and their difference images) generated by the lighting arrangements shown in FIGS. 2A–2B.

FIG. 3A similarly depicts an image generated by camera 26 when a defective semiconductor die (e.g., a die with adhesive on its surface) is illuminated by ring light or grazing light source 24. As shown in the illustration, the ring/grazing light reveals the adhesive as light patches 60, 62 on a dark background.

Figure 3B:
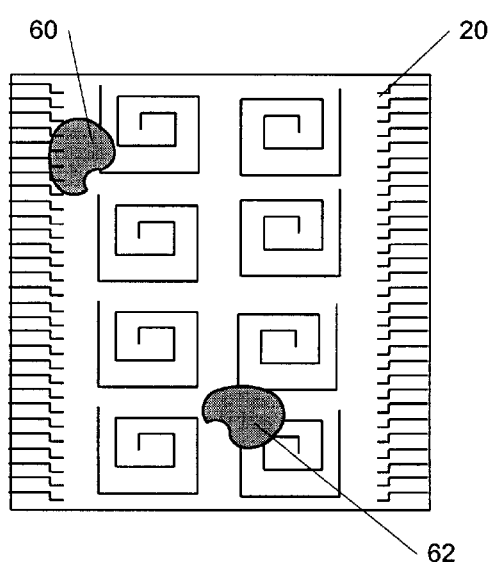

FIG. 3B depicts an image of the type generated by camera 26 when that same semiconductor die 20 is illuminated by on-axis lighting source 22. As shown in the drawing, the on-axis lighting reveals adhesive patches 60, 62, on the die surface as dark patches on a light background.

Figure 3C:
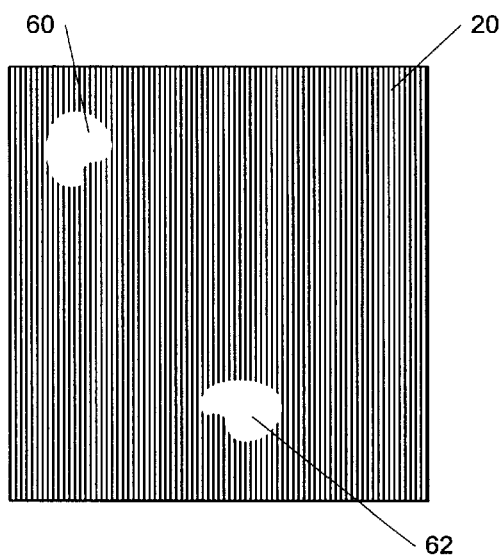

FIG. 3C reveals a result according to the invention of subtracting the images generated by camera 26 under these two separate lighting conditions. Put another way, FIG. 3C represents the result of subtracting the image of FIG. 3B from the image of FIG. 3A. In FIG. 3C, the defects on the semiconductor die surface 20 are revealed as very light patches against a very dark background, as indicated by dashed lines. (Note that this figure shows the output of the subtraction after remapping step 114, described below.)

As a consequence of the manner in which the defective semiconductor die 20 is illuminated by the illustrated embodiment for purposes of generating the images of FIGS. 3A and 3B, the difference image of FIG. 3C emphasizes the contrast between the defects 60, 62 and the background (i.e., die 20).

Figure 4:
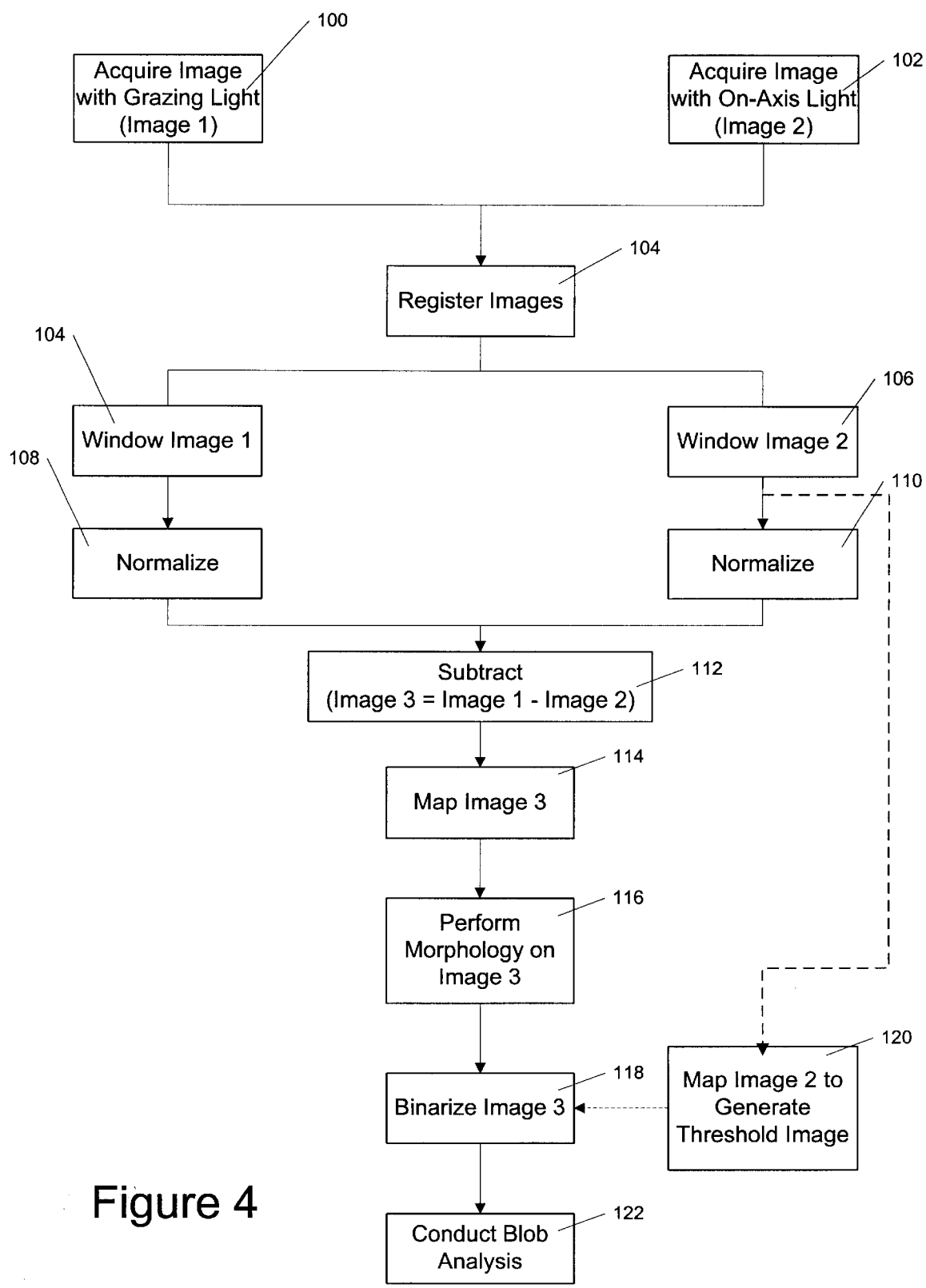
FIG. 4 depicts a methodology for machine image segmentation according to the invention.

FIG. 4 illustrates a method for image segmentation according to the invention. That method is described below with respect to an embodiment that uses on-axis/grazing illumination and that segments semiconductor die images to identify adhesive patches (i.e., defects) on the die surfaces (as shown, by way of example, in FIGS. 3A–3C). This same methodology can employed to detect adhesive patches on the leads of the die package (or lead frame), as well as in a host of other applications.

In step 100, the method acquires an image of the semiconductor die with lighting source 24 or other grazing light. Likewise, in step 102, the method acquires an image of the semiconductor die with on-axis light source 22. Though these images can be acquired at any times—though not concurrently—they are typically acquired at about the same time. This reduces the risk that the object will be moved between acquisitions and, thereby, removes the need to register the images.

In the discussion that follows, the image acquired in step 100 is referred to as "Image 1," while the image acquired in step 102 is referred to as "Image 2." Although the discussion herein is directed toward subtraction of Image 2 from Image 1, those skilled in the art will likewise appreciate that Image 1 can be subtracted from Image 2. Preferably, Image 2 is subtracted from Image 1 in instances where the object is lighter the background in Image 1, and where object is darker than the background in Image 2. Conversely, Image 1 is preferably subtracted from Image 2 in instances where the object is lighter the background in Image 2, and where object is darker than the background in Image 1.

In optional step 104, the method registers the images to insure alignment of the features therein. Though not necessary in many instances, this step is utilized if the semiconductor die or camera is moved between image acquisitions. Image registration can be performed, for example, by a two-dimensional cross-correlation of images, in the manner disclosed in Jain, *Fundamentals of Digital Image Processing*, (Prentice Hall 1989) at Chapter 2, the teachings of which are incorporated herein by reference.

In steps 104 and 106, the method windows Images 1 and 2. These steps, which are optional, reduce the area (or pixels)

of the respective images under consideration and, thereby, reduce processing time and/or computational resources. These steps can be performed by selecting the relevant subset of the pixel array of each image.

In steps 108 and 110, the method normalizes the (windowed) images. These optional steps, which compensate for overall differences in image intensity, can be performed by any technique known in the art. Preferably, however, normalization is global, using a map derived from the global statistics of the (windowed) images. The map is defined to match the extrema (or tails) of the statistical distributions of both images.

In step 112, the method generates a difference image, Image 3, by subtracting Image 2 from Image 1. This subtraction is performed in the conventional manner known in the art. Objects in Image 3, i.e., the "difference" image, can be isolated by standard techniques such as connectivity analysis, edge detection and/or tracking, and by thresholding. The latter technique is preferred, as discussed below.

In step 114, the method maps Image 3 to remove any negative difference values (i.e., negative pixel values) resulting from the subtraction. It also can be used to normalize (or rescale) the difference image to facilitate later stages of processing. This step, which can be preformed in a conventional manner known in the art, is optional.

In step 116, the method performs morphology on the difference image. Morphology, which is well known in the art, is a technique for eliminating or accentuating data in the difference image, e.g., by filtering out of variations due to video noise or small defects. This can be performed, for example, in a manner disclosed by Jain, supra, at Chapter 9.9, the teachings of which are incorporated herein by reference.

In step 118, the method thresholds, or binarizes, the image to distinguish or isolate objects of interest, such as adhesive patches on the die surface or package leads. Thresholding can be performed in the conventional manner known in the art. Thus, for example, a single threshold intensity value can be determined from a histogram of Image 3. Preferably, however, the threshold intensity value is predetermined, i.e., based on empirical analysis of prior images.

In certain applications, use of a high global threshold intensity value will result in portions of the object of interest being interpreted as background and, therefore, will result in poor segmentation. Likewise, use of a low global threshold intensity value will result in background being interpreted as objects of interest. To overcome this, the method includes an optional step of thresholding using a threshold image generated by mapping Image 2; see step 120. That threshold image is made up of pixels representing local threshold values.

In instances where a threshold image is used (e.g., in the bottle inner side wall inspection and the photo film envelope inspection described below), binarization step 118 involves subtracting the threshold image from image 3, then, mapping positive differences to 1 (indicating object) and negative differences to zero (indicating background).

Following binarization, the method of step 122 conducts connectivity analysis to determine the properties of any objects in the binarized image. Those properties, which include size, position, orientation, and principal moments, can be used to determine whether the object is indeed a defect requiring rejection of the semiconductor die.

Described above are embodiments of the invention employing direct and gazing light sources to segment images of a semiconductor die to identify defects thereon. Those skilled in the art will, of course, appreciate that such lighting arrangements and methodologies can be applied in segmenting and identifying a wide range of objects of interest.

Figure 2B:
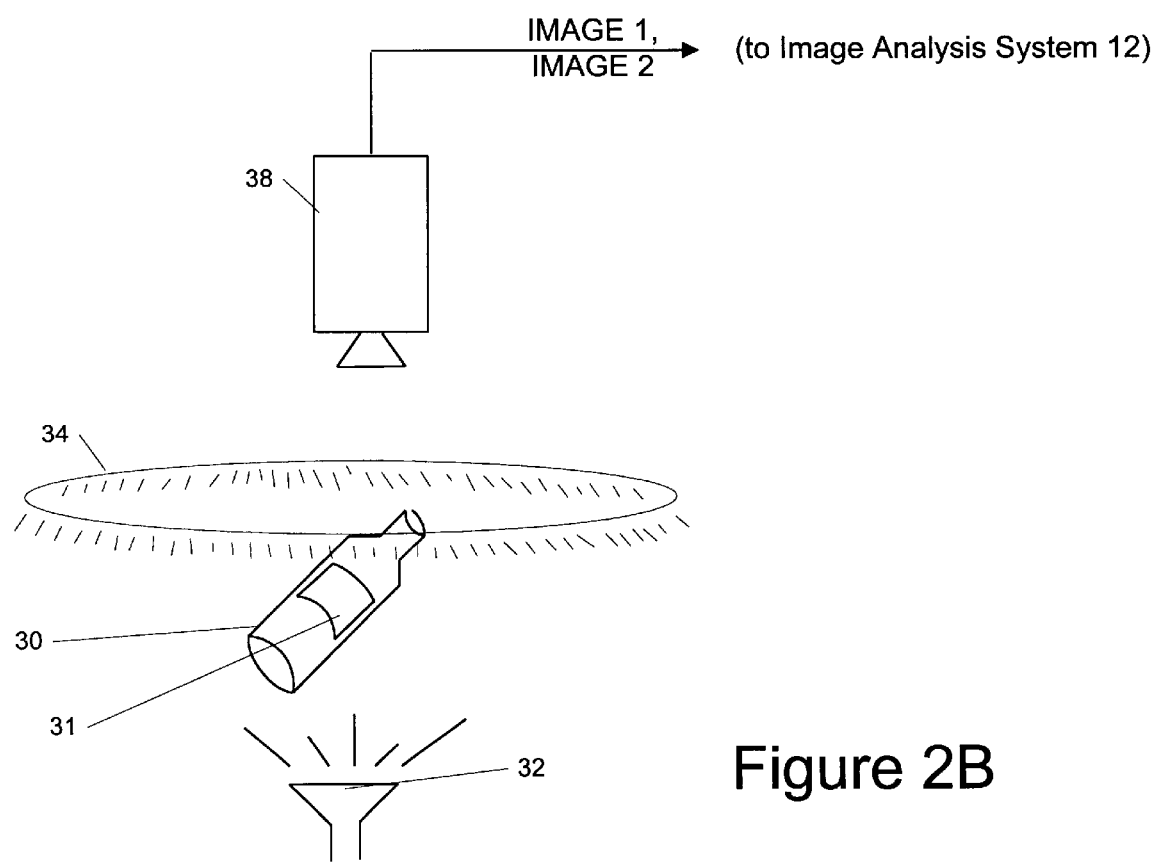

The use of additional lighting arrangements permits segmentation and object identification in still further applications. For example, FIG. 2B illustrates an arrangement employing front and back lighting to inspect the inner side wall of a bottle 30. In this regard, the prior employs a camera "looking downward" from the top of the bottle to inspect the inner side wall. This represents an attempt to inspect behind the bottle label 31, which typically fully circumscribes surrounds the bottle. However, use of the downward-looking camera—and, significantly, its wide angle lens—results in a large amount of geometric distortion.

As shown in FIG. 2B, the illustrated arrangement uses a side-viewing camera with intense back lighting to "see through" the label and, thereby, permit detection of unwanted objects (which tend to be opaque) on the inner side wall. In this arrangement, a front lit image of the bottle shows its front label and represents the effective "background." By subtracting that front lit image from the back-lit image, any objects on the side wall can be readily discerned. Those skilled in the art will, of course, appreciate that it is generally not necessary to subtract an image of the back label itself, since the glass and bottle hollow tend to diffuse (and thereby remove) any features it might present in the back-lit image.

In the drawing, there are shown back lighting illumination source 32 and front lighting illumination source 34. The lighting source 32 is of the type described above in connection with source 22. The lighting source 34 is of the type described above in connection with source 24. The light 32 is selected to provide sufficient intensity to permit backlighting of the entire inner side wall of the bottle, including that portion beneath the label 31. The front light 34 is selected and positioned to provide sufficient intensity to illuminate label 34. Camera 38 is of the conventional type known in the art.

The camera 38 and lighting sources 32, 34 are beneficially employed in accord with the invention to generate two images of the bottle that can be subtracted from one another to reveal any defects (e.g., cigarette butts, spiders, bugs, etc.) behind the label 31. To this end, a method as illustrated in FIG. 4 is used to acquire a first image (Image 1) of the bottle as illuminated by the front light 34; c.f., step 100. Image 1 shows the "background" alone, i.e., the print on the front label. The method is likewise used to acquire a second image (Image 2) of the bottle as illuminated by back light 32; c.f., step 102. Image 2 shows the background and object, i.e., the print on the front label as well as any defect on in inner side wall. Because of the dispersive effect of the glass and bottle hollow, print on the back label does not appear in Image 2.

Figure 3D:
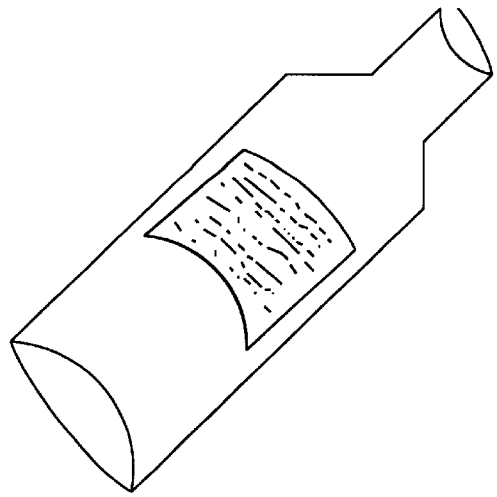
Figure 3E:
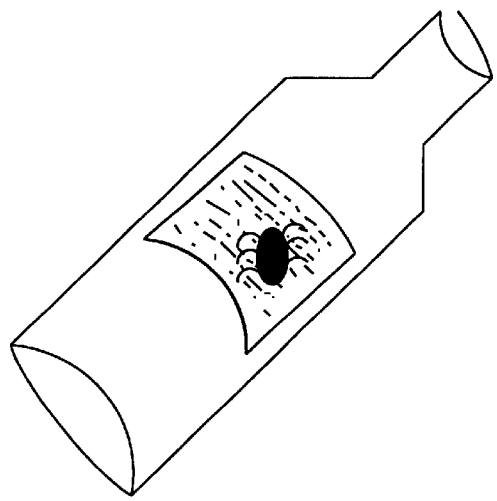
Figure 3F:
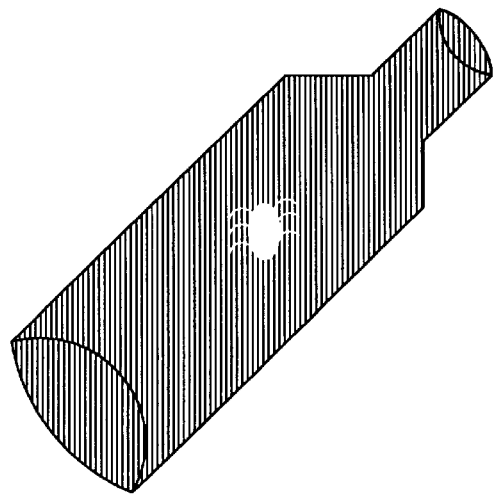

FIG. 3D depicts an image of the type resulting from back lighting bottle 30 with source 32. FIG. 3E depicts the image resulting from front lighting the bottle 30 with source 34. FIG. 3F depicts a difference image of the type produced by subtracting the image of FIG. 3E from the image of FIG. 3D.

As noted, the methodology of FIG. 4 can be applied to segment and identify defects in images of the types depicted in FIGS. 3D and 3E. Depending on the nature of the label 31, it can be typically necessary to utilize an image map of the type generated in step 120, as opposed to a single threshold value. This prevents defects from being obscured (or falsely indicated) as a result of labelling.

The front/back lighting arrangement of FIG. 2B can be used in applications other than bottle inner side wall inspection. For example, that lighting arrangement and the foregoing methodology can be used to identify film cartridges in sealed envelopes. The backlighting reveals any film cartridge in the envelope and the printing on the front of the envelope, while the front lighting reveals only the print on the front of the envelope. As above, the printing on the back of the envelope is diffused and, hence, does not appear in the backlit image. A further appreciation of this application of the methodology may be attained by reference to the Attachment filed herewith.

Figure 2C:
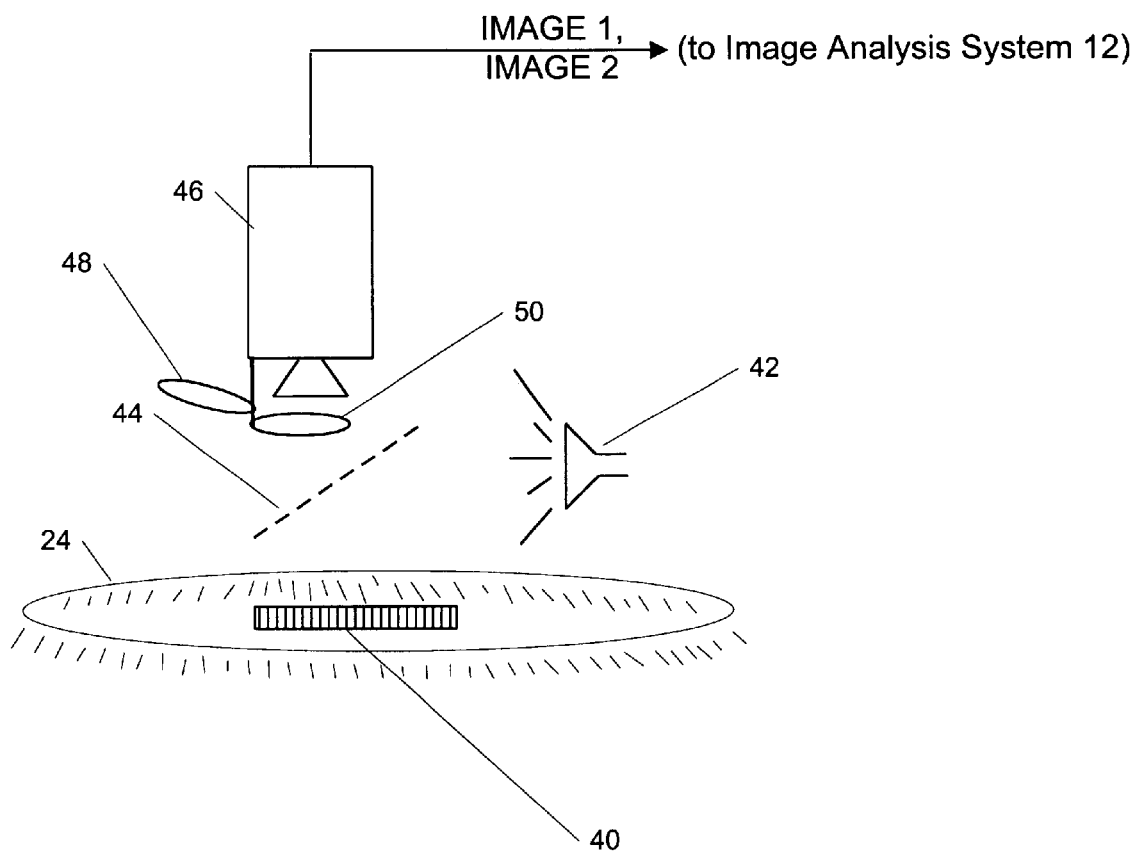

In further embodiments, the invention contemplates an image capture arrangement as shown in FIG. 2C. Here, rather than employing two lighting sources, a system according to the invention captures light reflected from the element 40 under inspection in two different wavelengths. For this purpose, the object is illuminated by a single light source 42, which can be, for example, a white light. Reflections from the object captured by camera 26 can be filtered to capture the differing wavelengths. Such filtering can be provided, e.g., by filters 48, 50, which are selected such that objects on the surface of element 40 appear differently (if at all) with respect to the background when the filtered light is captured by the camera 46.

In addition to capturing light of differing wavelengths, filters 48 and 50 can capture light of differing orientations. To this end, they can be polarizing lens of differing orientation for capturing light from source 42 (which may also be polarized) that is reflected off element 40.

Described above are machine vision methods meeting the objects set forth. These methods provide improved machine vision image segmentation and object identification overcoming the deficiencies of the prior art segmentation techniques, such as GTC. For example, apart from instances where an illuminated object is moved between image captures, the method does not require registration of images prior to subtraction. Nor the method require training. Still further, the method is applicable to the wide range of repeatable and nonrepeatable images.

It will be appreciated that the embodiments described above are illustrative only and that additional embodiments within the ken of those of ordinary skill in the art fall within the scope of the invention. Thus, for example, it will be appreciated that the lighting arrangements illustrated in FIGS. 2A–2C are merely by way of example, and that other lighting arrangements which result in difference images with greater object/background contrast may also be employed. Moreover, as noted above, although the discussion herein primarily refers to subtraction of Image 2 from Image 1, those skilled in the art will likewise appreciate that Image 1 can, alternatively, be subtracted from Image 2 with like success (albeit with a reversal of "polarity" in the resulting image).

In view of the foregoing, what I claim is:

1. A machine vision method for inspecting an object, comprising the steps of:

illuminating the object with an illumination source selected from a group of illumination sources including (i) a direct on-axis light source that illuminates the object with direct illumination along a direction of a first axis, and (ii) a diffuse off-axis light source that illuminates the object with diffuse illumination at a grazing angle, and generating a first on-axis image of the object with an image capture device while the object is so illuminated, the image capture device being oriented for capturing the first on-axis image in the direction of the first axis;

illuminating the object with another illumination source selected from the aforesaid group, and generating a second on-axis image of the object with the image capture device while it is so illuminated, the image capture device being oriented for capturing the second on-axis image in the direction of the first axis; and subtracting the second image from the first image to form a third image that increases a contrast between the object and a background thereof.

2. A method according to claim 1, wherein the step of generating the second image includes the step of generating that image such that subtraction of the second image from the first image increases a contrast between the object and the background.

3. A method according to claim 1, comprising the step of isolating the object within the third image.

4. A method according to claim 3, where the isolating step comprises the step of performing connectivity analysis on the third image to distinguish the object from the background.

5. A method according to claim 3, wherein the isolating step comprises the step of detecting and tracking edges in the third image to isolate the object.

6. A method according to claim 3, wherein the isolating step comprises the step of thresholding the third image to distinguish at least one of the object and its edges from the background.

7. A method according to claim 6, wherein the thresholding step comprises the step of determining an intensity threshold value that distinguishes at least one of the object and its edges from the background.

8. A method according to claim 6, comprising the steps of generating a threshold image from at least one of the first and second images, the threshold image having pixels representing local threshold intensity values; and using the threshold image to distinguish, in the third image, at least one of the object and its edges from the background.

9. A method according to claim 8, wherein the step of generating the threshold image includes the step of mapping image intensity values in the second image to generate the threshold image.

10. A method according to claim 8, wherein the step of using the threshold image includes the step of subtracting the threshold image from the third image.

11. A method according to claim 1, comprising the step of normalizing at least one of the first and second images before the subtracting step.

12. A method according to 11, wherein the normalizing step includes the steps of determining distributions of intensity values of each of the first and second images;

generating a mapping function for matching extrema of those distributions; and transforming the intensity values of at least one of the first and second images with that mapping function.

13. A method according to claim 1, including the step of generating the first and second images with light of different respective polarizations.

14. A method according to claim 1, including the step of generating the first and second images by illuminating the semiconductor device with emissions in different respective wavelengths.

15. A method according to claim 1, including the further step of registering the first and second images with one another before the subtracting step.

16. A machine vision method for inspecting an object, comprising the steps of:
  illuminating the object with an illumination source selected from a group of illumination sources including (i) a direct on-axis light source that illuminates the object with direct illumination along a direction of a first axis, and (ii) a diffuse off-axis light source that illuminates the object with diffuse illumination at a grazing angle;
  generating a first on-axis image of the object with an image capture device while the object is so illuminated, the image capture device being oriented for capturing the first on-axis image in the direction of the first axis;
  illuminating the object with another illumination source selected from the aforesaid group;
  generating a second on-axis image of the object with the image capture device while it is so illuminated, the image capture device being oriented for capturing the second on-axis image in the direction of the first axis;
  subtracting the second image from the first image to form a third image that enhances a contrast between the object and a background thereof; and
  isolating the object from the background in the third image by any of segmentation, edge detection and tracking, connectivity analysis, and thresholding.

17. A machine vision method for inspecting an object, comprising the steps of:
  illuminating the object with an illumination source selected from a group of illumination sources including a front lighting source and a back lighting source, and generating a first image of the object with an image capture device while it is so illuminated, the image capture device generating an image with radiation reflected from the object when the illumination source is a front lighting source, the image capture device generating an image with radiation transmitted through the object when the illumination source is a back lighting source;
  illuminating the object with another illumination source selected from the aforesaid group, and generating a second image of the object with the image capture device while it is so illuminated; and subtracting the second image from the first image to form a third image that increases a contrast between the object and a background thereof.

18. A method according to claim 17, wherein the step of generating the second image includes the step of generating that image such that subtraction of the second image from the first image increases a contrast between the object and the background.

19. A method according to claim 17, comprising the step of isolating the object within the third image.

20. A method according to claim 19, where the isolating step comprises the step of performing connectivity analysis on the third image to distinguish the object from the background.

21. A method according to claim 19, wherein the isolating step comprises the step of detecting and tracking edges in the third image to isolate the object.

22. A method according to claim 19, wherein the isolating step comprises the step of thresholding the third image to distinguish at least one of the object and its edges from the background.

23. A method according to claim 22, wherein the thresholding step comprises the step of determining an intensity threshold value that distinguishes at least one of the object and its edges from the background.

24. A method according to claim 22, comprising the steps of
  generating a threshold image from at least one of the first and second images, the threshold image having pixels representing local threshold intensity values; and
  using the threshold image to distinguish, in the third image, at least one of the object and its edges from the background.

25. A method according to claim 24, wherein the step of generating the threshold image includes the step of mapping image intensity values in the second image to generate the threshold image.

26. A method according to claim 24, wherein the step of using the threshold image includes the step of subtracting the threshold image from the third image.

27. A method according to claim 17, comprising the step of normalizing at least one of the first and second images before the subtracting step.

28. A method according to 27, wherein the normalizing step includes the steps of
  determining distributions of intensity values of each of the first and second images;
  generating a mapping function for matching extrema of those distributions; and
  transforming the intensity values of at least one of the first and second images with that mapping function.

29. A method according to claim 17 including the further step of registering the first and second images with one another before the subtracting step.

30. A machine vision method for inspecting an object, comprising the steps of:
  illuminating the object with an illumination source selected from a group of illumination sources including a front lighting source and a back lighting source;
  generating a first of the object with an image capture device while it is so illuminated, the image capture device generating an image with radiation reflected from the object when the illumination source is a front lighting source, the image capture device generating an image with radiation transmitted through the object when the illumination source is a back lighting source;
  illuminating the object with another illumination source selected from the aforesaid group;
  generating a second image of the object with the image capture device while it is so illuminated;
  subtracting the second image from the first image to form a third image that enhances a contrast between the object and a background thereof; and
  isolating the object from the background in the third image by any of segmentation, edge detection and tracking, connectivity analysis, and thresholding.

31. A machine vision method for inspecting an object, comprising the steps of:
  lighting the object with a light source selected from a group of light sources including (i) a direct on-axis light source that lights the object with direct lighting along a direction of a first axis, and (ii) a diffuse off-axis light source that lights the object at a grazing angle, and generating a first on-axis image of the object with the image capture device while the object is so lighted, the image capture device being oriented for capturing the first on-axis image in the direction of the first axis;
  lighting the object with another light source selected from the aforesaid group, and generating a second on-axis image of the object with the image capture device while it is so lighted, the image capture device being oriented for capturing the second on-axis image in the direction of the first axis; and subtracting the second image from the first image to form a third image that increases a contrast between the object and a background thereof.

32. A method according to claim 31, wherein the step of generating the second image includes the step of generating that image such that subtraction of the second image from the first image increases a contrast between the object and the background.

33. A method according to claim 31, comprising the step of isolating the object within the third image.

34. A method according to claim 33, where the isolating step comprises the step of performing connectivity analysis on the third image to distinguish the object from the background.

35. A method according to claim 33, wherein the isolating step comprises the step of detecting and tracking edges in the third image to isolate the object.

36. A method according to claim 33, wherein the isolating step comprises the step of thresholding the third image to distinguish at least one of the object and its edges from the background.

37. A method according to claim 36, wherein the thresholding step comprises the step of determining an intensity threshold value that distinguishes at least one of the object and its edges from the background.

38. A method according to claim 36, comprising the steps of generating a threshold image from at least one of the first and second images, the threshold image having pixels representing local threshold intensity values; and using the threshold image to distinguish, in the third image, at least one of the object and its edges from the background.

39. A method according to claim 38, wherein the step of generating the threshold image includes the step of mapping image intensity values in the second image to generate the threshold image.

40. A method according to claim 38, wherein the step of using the threshold image includes the step of subtracting the threshold image from the third image.

41. A method according to claim 31, comprising the step of normalizing at least one of the first and second images before the subtracting step.

42. A method according to 41, wherein the normalizing step includes the steps of determining distributions of intensity values of each of the first and second images;

generating a mapping function for matching extrema of those distributions; and transforming the intensity values of at least one of the first and second images with that mapping function.

43. A method according to claim 31, including the step of generating the first and second images with light of different respective polarizations.

44. A method according to claim 31, including the step of generating the first and second images by lighting the semiconductor device with emissions in different respective wavelengths.

45. A method according to claim 31, including the further step of registering the first and second images with one another before the subtracting step.

46. A machine vision method for inspecting an object, comprising the steps of:

lighting the object with a light source selected from a group of light sources including (i) a direct on-axis light source that lights the object with direct lighting along a direction of a first axis, and (ii) a diffuse off-axis light source that lights the object at a grazing angle, and generating a first on-axis image of the object with the image capture device while it is so lighted, the image capture device being oriented for capturing the first on-axis image in the direction of the first axis;

lighting the object with another light source selected from the aforesaid group, and generating a second on-axis image of the object with the image capture device while it is so lighted, the image capture device being oriented for capturing the second on-axis image in the direction of the first axis;

subtracting the second image from the first image to form a third image that enhances a contrast between the object and a background thereof; and isolating the object from the background in the third image by any of segmentation, edge detection and tracking, connectivity analysis, and thresholding.

47. A machine vision method for inspecting an object, comprising the steps of:

lighting the object with a lighting source selected from a group of lighting sources including a front lighting source and a back lighting source, and generating a first image of the object with an image capture device while it is so lighted the image capture device generating an image with radiation reflected from the object when the lighting source is a front lighting source, the image capture device generating an image with radiation transmitted through the object when the lighting source is a back lighting source;

lighting the object with another lighting source selected from the aforesaid group, and generating a second image of the object with the image capture device while it is so lighted; and subtracting the second image from the first image to form a third image that increases a contrast between the object and a background thereof.

48. A method according to claim 47, wherein the step of generating the second image includes the step of generating that image such that subtraction of the second image from the first image increases a contrast between the object and the background.

49. A method according to claim 47, comprising the step of isolating the object within the third image.

50. A method according to claim 49, where the isolating step comprises the step of performing connectivity analysis on the third image to distinguish the object from the background.

51. A method according to claim 49, wherein the isolating step comprises the step of detecting and tracking edges in the third image to isolate the object.

52. A method according to claim 49, wherein the isolating step comprises the step of thresholding the third image to distinguish at least one of the object and its edges from the background.

53. A method according to claim 52, wherein the thresholding step comprises the step of determining an intensity threshold value that distinguishes at least one of the object and its edges from the background.

54. A method according to claim 52, comprising the steps of generating a threshold image from at least one of the first and second images, the threshold image having pixels representing local threshold intensity values; and using the threshold image to distinguish, in the third image, at least one of the object and its edges from the background.

55. A method according to claim 54, wherein the step of generating the threshold image includes the step of mapping image intensity values in the second image to generate the threshold image.

56. A method according to claim 54, wherein the step of using the threshold image includes the step of subtracting the threshold image from the third image.

57. A method according to claim 47, comprising the step of normalizing at least one of the first and second images before the subtracting step.

58. A method according to 57, wherein the normalizing step includes the steps of determining distributions of intensity values of each of the first and second images;

generating a mapping function for matching extrema of those distributions; and transforming the intensity values of at least one of the first and second images with that mapping function.

59. A method according to claim 47 including the further step of registering the first and second images with one another before the subtracting step.

60. A machine vision method for inspecting an object, comprising the steps of:

lighting the object with a lighting source selected from a group of lighting sources including a front lighting source and a back lighting source;

generating a first image of the object with an image capture device while it is so lighted, the image capture device generating an image with radiation reflected from the object when the lighting source is a front lighting source, the image capture device generating an image with radiation transmitted through the object when the lighting source is a back lighting source;

lighting the object with another lighting source selected from the aforesaid group;

generating a second image of the object with the image capture device while it is so lighted;

subtracting the second image from the first image to form a third image that enhances a contrast between the object and a background thereof; and isolating the object from the background in the third image by any of segmentation, edge detection and tracking, connectivity analysis, and thresholding.

* * * * *